April 21, 1959

F. O. JENTE 2,883,027

SELF-SERVICE RESTAURANT APPARATUS

Filed Jan. 10, 1958

2 Sheets-Sheet 1

INVENTOR: Fred Oskar Jente

April 21, 1959  F. O. JENTE  2,883,027
SELF-SERVICE RESTAURANT APPARATUS
Filed Jan. 10, 1958  2 Sheets-Sheet 2

INVENTOR:
Fred Oskar Jente

United States Patent Office 2,883,027
Patented Apr. 21, 1959

2,883,027
SELF-SERVICE RESTAURANT APPARATUS

Fred Oskar Jente, Mount Vernon, N.Y.

Application January 10, 1958, Serial No. 708,226

3 Claims. (Cl. 194—51)

One object of the present invention is to provide a means of instant service to a great number of people simultaneously by employing a substantially circular counter, on the inside of which revolve gradually, within reach of each customer, a plurality of glass-walled food display compartments, which are arranged vertically in three circular tiers, recessed from top to bottom, and one section of which always being in the adjacent kitchen for convenient replenishment of said compartments.

Another object of the invention is to provide for an attractive, appetizing, and sanitary way of displaying food behind the coin operated doors of said compartments.

Still another object of the present invention is to provide speedy service under maximum sanitary conditions by using throwaway dishes and utensils, made of plastic, paper, or a combination of both, and by employing an individually replaceable counter covering.

Another object of my invention is to introduce a mechanical means of clearing said counter of soiled dishes and leftover food quickly and efficiently and guiding said refuse automatically to a garbage collection area without the necessity of handling it manually at any time.

Figure 1:
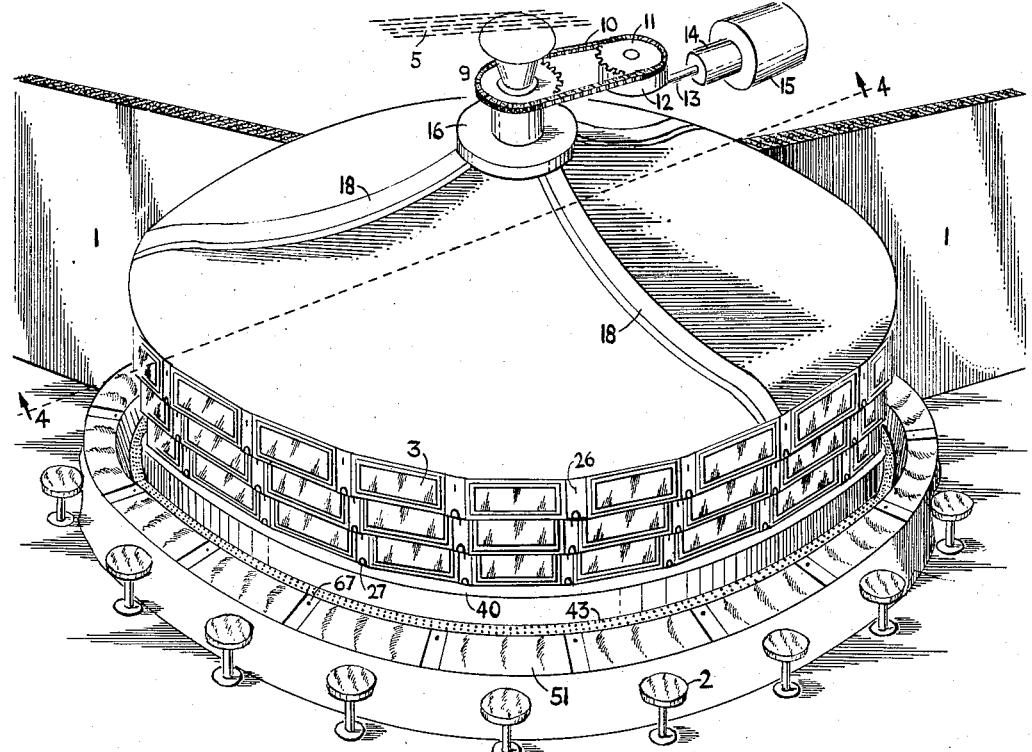
Figure 3:
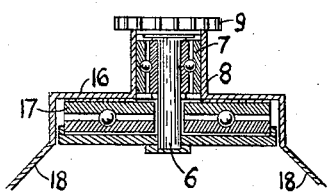
Figure 2:
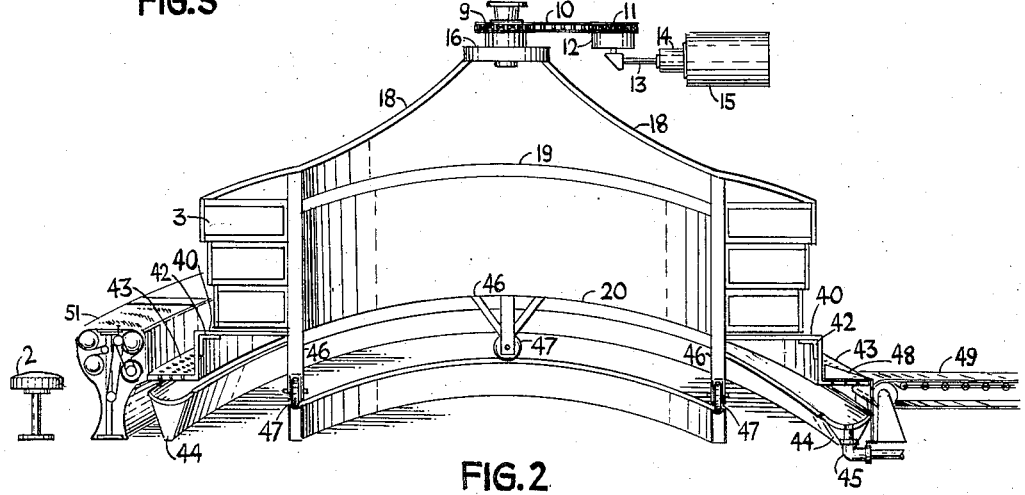
Figure 4:
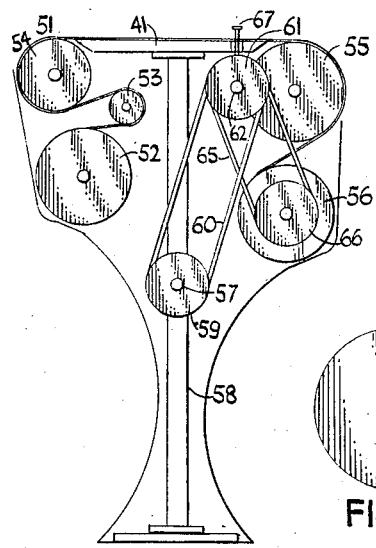
Figures 5, 6:
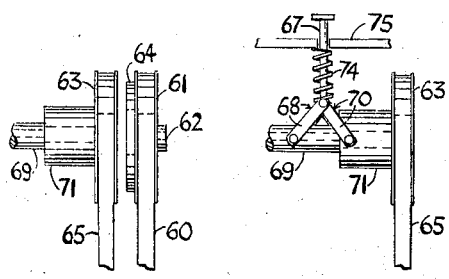
Figure 5A:
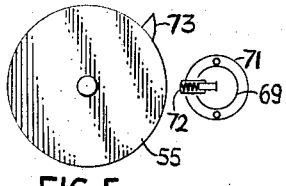
Figures 7, 8:
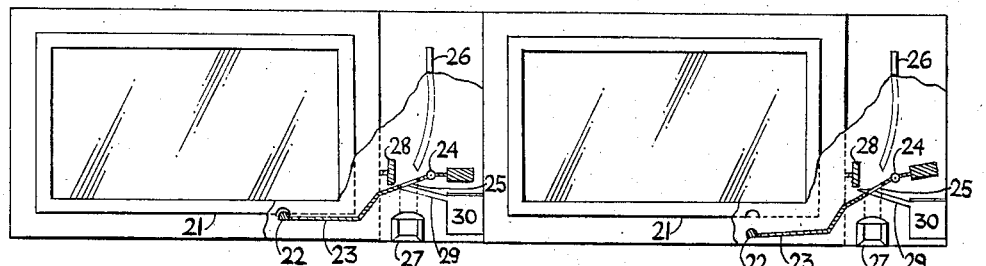
Figure 9:
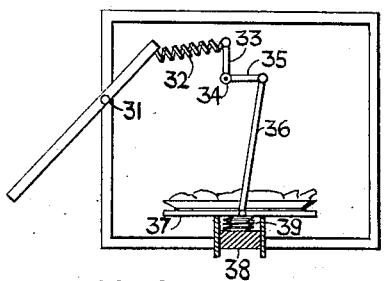
Figure 10:
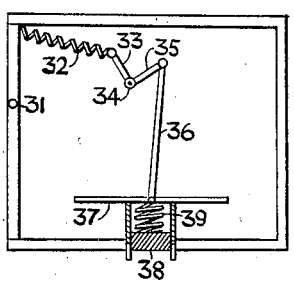
Figure 11:
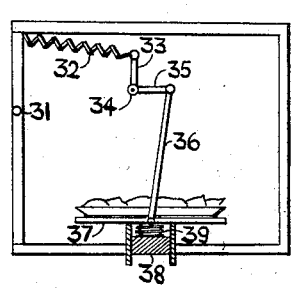

Further objects and advantages of the invention will become apparent as the following description proceeds, taken in connection with the accompanying drawings, in which:

Fig. 1 is a top plan view of the projected invention;
Fig. 2 is a sectional view taken along the dotted line 4—4 in Fig. 1;
Fig. 3 is an enlarged sectional view of the suspension and driving device of the serving element;
Fig. 4 is a detailed side view of the roller mechanism moving the covering across the counter;
Fig. 5 and Fig. 6 are a sectional front view of the key operated friction clutch driving said roller mechanism, Fig. 5A being a sectional view of the measuring roller and adjacent parts;
Fig. 7 and Fig. 8 are enlarged front sectional views of the coin mechanism actuating the doors of the display compartments;
Figs. 9, 10, 11 are side sectional views of said display compartments.

Referring more in detail to the drawings, reference numerals 1 and 2 designate the kitchen wall and a stool respectively. A bell shaped supporting framework rotates three circular tiers of display compartments 3, a section of which always being in the kitchen for convenient replenishment of said compartments. Said framework is suspended from the ceiling 5 and anchored to the same by means of a steel unit (Fig. 3) in the shape of an inverted mushroom. On the vertical shaft 6 of said steel unit is rotatably mounted on ball bearings 7 a sleeve 8, adjacent to the top of which is rigidly secured a sprocket 9, around which is led an endless roller chain 10 (Fig. 2), connecting horizontally another sprocket 11, the latter engaging, by way of a magnetic clutch 12, an outlet shaft 13 from a speed reduction gear box 14 and an electric motor 15. The lower portion of said vertically disposed sleeve extends horizontally into a plate 16, resting tightly on a thrust ball bearing 17 to reduce friction. Rigidly attached to the outer fringe of said plate are a number of angular strips 18 of steel bent down and outward, which in conjunction with the stabilizing rings 19 and 20 make up the supporting framework and hold said display compartments, the latter being slightly recessed from top to bottom to improve their accessibility. The glass door 21 (Figs. 7 and 8) of each display compartment is held resiliently closed by a stud 22, which engages a hollow in the lower portion of the door frame and which is mounted on an arm 23 balanced on a pivot 24. Fastened to said arm is a coin receiving platform 25, which is of annular shape and inclined toward stud 22. When the required coin is deposited in the slot 26—smaller ones will drop through the coin receiving platform into the coin return receptacle 27, the device being set for quarters—the weight of the coin will depress said arm 23 and thus disengage said stud, the coin itself sliding underneath the coin stop 28 down the curved coin chute 29 into the coin box 30.

Said stud disengaged, said glass compartment door opens outward (Figs. 9 and 11), pivoting on horizontally disposed pair of pins 31, pulled by a coil spring 32, which is attached to the upper portion of frame of door and to a rigid arm 33, coaxially mounted on a horizontal pin 34 with another arm 35, rigidly attached and disposed at an angle with respect to the former. To the free end of rigid arm 35 is rotatably connected a lever 36, hooked to a display platform 37, which is vertically sleeved on a stud 38 and resiliently mounted on the same by means of a coil spring 39. Said spring will push said platform back to its original position, as soon as the food is removed from the same (Fig. 10), moving up said lever, thus voiding pull on said spring 32 and closing said glass door automatically. There is a spring mechanism of the type described above within either side of said display compartment to insure better functioning. Said compartments could either be cooled by refrigeration coils or heated by hot air ducts (neither shown).

Just below the lowest tier of display compartments is rigidly flanged to the supporting framework a narrow shelf 40 (Figs. 1 and 2), approximately level with the top of counter 41, however, separated from the same by a gap of several inches. To the outer edge of said shelf are rigidly attached a plurality of brackets 42 holding in place, somewhat below the counter level, the garbage disposal shelf 43, which is perforated to allow liquids to seep through into a trough 44, the latter being gradually inclined clockwise toward a gutter 45. Secured to said stabilizing ring 20, behind the lowest tier of display compartments, are a plurality of metal supports 46, each having at its lower end a rubber covered wheel 47, which is rotatably mounted on said support and runs in a groove resting on the floor. A deflector across said garbage disposal shelf guides the refuse onto a conveyor belt 49, which is driven by an electric motor not shown and takes it to the garbage disposal area outside.

The counter is divided into a plurality of serving sections 50 (Fig. 1), now dealing more in detail with the counter clearing element, which complements the serving element of my invention. As seen in Figs. 1 and 4, the counter space in front of each customer is covered with table cloth 51, which can be laundered, or any other suitable material, which can be discarded. Said table cloth or similar material unwinds from a roller 52 in a clockwise direction, passes over a tightening roller 53 to a feeding roller 54, over the counter top 41 to a measuring roller 55, onto a driving roller 56, all of which are rigidly mounted on shafts, said driving roller revolving counterclockwise and deriving its power from an electric motor (not shown) in the following manner: Said electric motor (not shown) drives counterclockwise a centrally located shaft 57, which extends the entire length of the counter and is adequately supported by props 58. Fixed on said shaft at equal distances are a plurality of pulleys 59, one underneath each dividing space between two serving sections. An endless belt 60 led over said pulley 59 engages pulley 61, the latter being rotatably mounted on a shaft 62 and positioned opposite another pulley 63 (Figs. 5 and 6), which can be connected with pulley 61 by means of a friction clutch 64. An endless belt 65 is trailed over pulley 63, so as to engage vertically another pulley 66, which is fixed adjacent to the end of the shaft of said driving roller, thus turning the same in a counterclockwise direction. Said friction clutch can be actuated by a key 67, which is pivotally mounted on two pairs of arms, one 68 being attached rotatably on a shaft 69, the other pair 70 being attached in the same manner to either side of a sleeve 71, which is slidable longitudinally on said shaft 69. Said sleeve is moved by said pair of arms into position, so as to connect pulley 63, rotatably mounted adjacent to one end of said sleeve, with pulley 61 via said frictional engagement. While the latter is engaged with the former, said sleeve is held in position by means of a spring actuated pin 72 (Fig. 5A), which is fixed on said shaft 69 at a right angle from the vertical toward the measuring roller and pops through a hole in said sleeve. Said pin is depressed and thus disengaged by a cam 73, which is rigidly mounted adjacent to one end of the measuring roller and protrudes somewhat from the outer circle described by the ends of said cylindrical roller. The circumference of said measuring roller is slightly greater than the length of the covering material required on the counter to allow for a certain amount of overlap. When said measuring roller completes one revolution, said cam presses the spring actuated pin below said sleeve, allowing the latter to slide longitudinally, pulled by a coil spring 74, which is attached to the top plate 75 and secured to the base of said key, thus decreasing the angle between said pairs of arms and moving said key back to its original position, thereby disengaging said friction clutch.

In order to give each customer the opportunity to stop the rotation of said bell shaped serving element to serve himself more easily from one of the display compartments, it is contemplated to provide each serving section with a key, which is connected with said magnetic clutch by means of an electrical wiring system, well-known to those skilled in the art and not shown here. The purpose of said wiring system is to provide for a means to disengage said magnetic clutch, when said key is depressed, and to engage the former, when the latter is released.

No mention is made within the scope of this invention of the manner in which hot coffee is dispensed automatically to each customer. This will be the subject of another application at a later date. For the time being, a coin operated unit of conventional design, well-known to those skilled in the art, will suffice.

While I have illustrated and described what I now regard as the preferred embodiment of my invention, the construction is, of course, subject to modifications without departing from the spirit of the scope of my invention. I, therefore, do not wish to restrict myself to the particular form of construction illustrated and described, but desire to avail myself of all modifications which may fall within the projected scope of the appended claims.

Having thus described my invention, what I claim is:

1. In a circular self-service device for counter-type restaurants comprising mainly a bell shaped supporting framework, suspended rotatably from the ceiling and resting rotatably on the floor by means of a plurality of props, each ending in a rubber-covered wheel, said framework holding rigidly attached to the same three vertically disposed tiers of glass-walled food display compartments, covering the supporting framework in its entire circumference, its lowest tier being approximately level with a counter, its highest still being within easy reach of customers sitting down in front of said counter; a narrow shelf being rigidly flanged to said supporting framework in its entire circumference somewhat below and outside the lowest tier of display compartments, thus forming the support for a plurality of brackets, which emanate from the outer fringe of said shelf and carry in its entire circumference, well below the counter level, a perforated garbage disposal shelf over a floor-based trough clockwise inclined; means for suspending and driving said self-service device by employing a steel unit, anchored to the ceiling and in the form of an inverted mushroom, around the shaft of which is vertically disposed on ball bearings a sleeve, bearing rigidly a sprocket at its top and having its lower portion extended and resting rotatably on the horizontal section of said steel unit, thus carrying the entire supporting framework and driving said self-service device by trailing a roller chain over the sprocket adjacent to the top of said sleeve and over another horizontally disposed sprocket, which receives its power from an electric motor through a speed reduction gear and a magnetic clutch.

2. In a circular self-service device for counter-type restaurants, being of a design as expounded in claim 1, said display compartments being coin operated in a manner where the weight of the coin depresses a pivotally balanced arm, which has mounted on its free end a stud, disengaging a hollow in the lower portion of frame of glass door, its lower portion opening outward on horizontally disposed pivots, its upper portion being pulled inward on either side by a coil spring, one end of which being attached to said frame, the other being secured to one of two arms, mounted pivotally on a horizontally disposed pin, the other arm being rotatably attached to a lever, which connects one side of the platform, from the center of which projects downward a sleeve, the latter being mounted resiliently on a stud by means of a coil spring, said spring being compressed, when food is on said display platform, and expanding, when the food is removed, and thereby causing said door to close automatically.

3. In a substantially circular counter in order to complement the serving element of said self-service device, as expounded in claim 1, with approximately one fifth of its circumference missing where the kitchen projects into its path, the remainder being divided into equal-sized serving sections, each of which has its greater rectangular portion covered with a material that can either be laundered or discarded, said material unwinding from a roller underneath said counter, passing over a tightening roller to a feeding roller, over the counter top, down over a measuring roller onto a driving roller, adjacent to one end of its shaft is rigidly mounted a pulley, being driven by a vertically disposed endless belt, led over another pulley which is rigidly fixed on a sleeve, the latter being slidable longitudinally on a horizontally disposed shaft by means of a spring actuated key and a pair of arms, mounted pivotally on said sleeve, which can bring said pulley mounted thereon in frictional engagement with a pulley opposite it, and which is held in place by spring actuated pin, mounted on said shaft and passing through an opening in said sleeve, said pin being disengaged by a cam mounted on side of measuring roller whose circumference is slightly greater than the length of the material required on top of the counter, the latter pulley being driven through an endless belt by another pulley fixed rigidly on a slow turning shaft, which derives its power from an electric motor and which extends the entire length of the counter, said shaft being adequately supported and bearing a pulley, as the one just mentioned, underneath each serving section, thus said key causing the counter covering to move toward the display compartments and to dump the refuse through a gap onto the garbage disposal shelf, leaving a clean section of material in front of the customer.

References Cited in the file of this patent

UNITED STATES PATENTS

| | | |
|---|---|---|
| 751,681 | Philipps | Feb. 9, 1904 |
| 2,815,539 | Schneider | Dec. 10, 1957 |